US008867362B2

(12) United States Patent
De Franca Lima et al.

(10) Patent No.: US 8,867,362 B2
(45) Date of Patent: Oct. 21, 2014

(54) CONGESTION CONTROL FOR INTERWORKING BETWEEN NETWORKS

(75) Inventors: Octavio Jose De Franca Lima, The Colony, TX (US); Ke-Chi Jang, Plano, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 882 days.

(21) Appl. No.: 12/769,807

(22) Filed: Apr. 29, 2010

(65) Prior Publication Data

US 2011/0176414 A1 Jul. 21, 2011

Related U.S. Application Data

(60) Provisional application No. 61/295,271, filed on Jan. 15, 2010.

(51) Int. Cl.
*H04W 28/02* (2009.01)
*H04W 36/00* (2009.01)
*H04L 12/801* (2013.01)
*H04W 92/02* (2009.01)
*H04W 76/02* (2009.01)
*H04W 88/16* (2009.01)
*H04W 36/22* (2009.01)

(52) U.S. Cl.
CPC ............... *H04L 47/14* (2013.01); *H04W 76/02* (2013.01); *H04W 88/16* (2013.01); *H04W 92/02* (2013.01); *H04W 36/22* (2013.01); *H04L 47/35* (2013.01); *H04L 47/12* (2013.01)
USPC ............................ 370/237; 370/331; 370/352

(58) Field of Classification Search
None
See application file for complete search history.

(56) References Cited

U.S. PATENT DOCUMENTS

| 2009/0257412 | A1* | 10/2009 | Kuokkanen ................... 370/338 |
| 2010/0317346 | A1* | 12/2010 | Ali et al. ........................ 455/436 |
| 2011/0032819 | A1* | 2/2011 | Schliwa-Bertling et al. .. 370/229 |
| 2011/0063977 | A1* | 3/2011 | Halfmann et al. ............ 370/235 |
| 2011/0077011 | A1* | 3/2011 | Wang et al. ................... 455/445 |
| 2011/0110228 | A1* | 5/2011 | de Franca Lima et al. ... 370/230 |
| 2011/0110326 | A1* | 5/2011 | Rexhepi et al. ............... 370/331 |
| 2011/0255410 | A1* | 10/2011 | Yamen et al. ................. 370/237 |

OTHER PUBLICATIONS

Ericsson et al: "Handling of congestion for e1xCSFB", 3GPP Draft; R2-096712, 3rd Generation Partnership Project (3GPP), Mobile Competence Centre , 650, Route Des Lucioles , F-06921 Sophia-Antipolis Cedex, France, no. Jeju; 20091109, Nov. 13, 2009, XP050391194.
"Digital cellular telecommunications system (Phase 2+); Universal Mobile Telecommunications System (UMTS); LTE; Single Radio Voice Call Continuity (SRVCC); Stage 2 (3GPP TS 23.216 version 9.2.0 Release 9)", Technical Specification, European Telecommunications Standards Institute (ETSI), 650, Route Des Lucioles ; F-06921 Sophia-Antipolis; France, No. V9.2.0, Jan. 1, 2010, P014045246.
"3rd Generation Partnership Project; Technical Specification Group Services and System Aspects; Circuit Switched Fallback in Evolved Packet System; Stage 2 (Release 9)", 3GPP TS 23.272 V9.2.0 vol. V9.2.0, Dec. 1, 2009, XP007918463.

* cited by examiner

Primary Examiner — Marcus R Smith

(57) ABSTRACT

A congestion indication is introduced to indicate the congestion status of the circuit-switched network to a packet-switched network, such as an LTE network. The congestion indication is transmitted from an interworking function in the circuit-switched network to the LTE network. The congestion indication and/or other congestion information is transmitted with a circuit services signaling message that is otherwise being sent. Piggy-backing the congestion information with other circuit services signaling messages reduces the amount of signaling over the LTE network.

14 Claims, 6 Drawing Sheets

CONGESTION CONTROL FOR INTERWORKING BETWEEN NETWORKS

RELATED APPLICATION

This application claims the benefit of U.S. Provisional Patent Application 61/295,271 filed on Jan.15, 2010, which is incorporated herein by reference.

BACKGROUND

In the past, mobile communication systems have primarily used circuit-switched networks to provide voice services and low speed data services and packet-switched networks to provide high-speed data services. Circuit-switched networks allocate a dedicated channel for each voice or data call. In packet-switched networks, data is transmitted in packets over shared network resources. In general, packet-switched networks typically provide increased bandwidth efficiency as compared to circuit-switched network, while circuit-switched networks typically provide higher quality of service guarantees. The third generation (3G) standard integrated packet-switched data networks with circuit-switched voice networks to provide both voice and data services.

The fourth generation (4G) standard under development and known as Long Term Evolution (LTE) is a packet-switched network that does not have inherent support for voice services. A number of proposals are under consideration for providing voice communications in LTE networks. However, it is uncertain at this point whether the initial roll-out of LTE systems will include support for voice communications. If the initial roll-out does not provide support for voice communications, the service providers can leverage existing circuit-switched networks to provide voice services. Even if the early LTE systems support voice communications, the service providers will likely phase in LTE systems gradually and leverage existing 3G networks to provide service in areas where LTE networks do not provide coverage. Therefore, interworking protocols are needed to enable interworking between LTE and existing circuit-switched networks.

Several proposals are being considered to enable interworking between 3G and LTE networks to allow service providers to leverage existing networks and gradually phase in LTE networks. One approach to interworking is known as Single Radio Voice Call Continuity (SRVCC). The SRVCC approach allows an LTE voice call to be handed over to a 3G network when LTE coverage is not available. The SRVCC approach is described in 3GPP TS.23.216. Another interworking approach is known as Circuit-Switched Fallback (CSFB). CSFB is an interworking mechanism that allows service providers to use existing circuit-switched networks to provide voice services to LTE users. A mobile user can register with the circuit-switched network after attaching to the LTE network. For voice communications, the user is redirected from the LTE network to a 3G network providing voice services.

In the 3G network, a congestion control mechanism may be used to control congestion. The objective of the congestion control mechanism is to reduce the number of mobile-terminated and mobile-originated calls when the network is overloaded. The congestion control mechanism uses a persistence parameter broadcast to the mobile terminals over a downlink broadcast channel. The persistence parameter determines the probability that the mobile terminal will attempt to access the network. Typically, the mobile terminal performs a random check with the persistence parameter. If the mobile terminal passes the random check, the mobile terminal is allowed to access the network. Because the persistence parameter is transmitted in the 3G network, a mobile terminal operating in the LTE network may not receive the persistence parameters. Thus, the mobile terminals in the LTE network will not know when the 3G network is congested.

It has been proposed to broadcast the persistence parameter over the LTE broadcast channel. When the operator detects that there is an overload in the 3G system, the operator can update the persistence parameter in LTE so that the number of circuit-switched fallback attempts is reduced or stopped for a time period. Similar to 3G systems, the mobile terminal will read the persistence parameter and perform a random check before attempting circuit-switched fallback. Thus, signaling loads caused by failed circuit-switched fallback attempts on the LTE radio interface are avoided.

Another proposal is to convey congestion information to the mobile terminal over the LTE broadcast channel after the mobile terminal attempts circuit-switched fallback. When the mobile terminal attempts circuit-switched fallback, the mobile terminal sends a circuit-switched message to the mobile switching center in the 3G network. The interworking function may either accept or reject the signaling message. In either case, the interworking function can indicate the congestion status in a response to the signaling message.

The proposed solutions for congestion management are not entirely satisfactory. The problem with the first proposal is that there is no standard mechanism for making the congestion status of the 3G network known in the LTE network. Although vendors may implement proprietary protocols within the operation and management systems to convey congestion information from the 3G network to the LTE network, the vendor equipment will, in such case, not be interoperable with other vendor equipment. Further, the dynamic nature of the congestion status means that the proprietary system needs to update the congestion information dynamically. Conventional operation and management systems are not normally designed to provide dynamic functionality.

The problem with the second approach is that the congestion status of the 3G network is known only after the mobile terminal attempts circuit-switched fallback. Unnecessary signaling over the LTE network will result if a circuit-switched fallback attempt fails due to congestion in the 3G network.

Both of the proposed approaches contemplate using System Information Block 8 to broadcast congestion information. System Information Block 8 is a common channel information element. Continuously broadcasting congestion information over the broadcast channel in the LTE network would consume signaling bandwidth that could be used for other purposes.

Accordingly, there is a need for a mechanism to convey congestion information from the 3G network to mobile terminals in the LTE network.

SUMMARY

The present invention provides a mechanism to signal the congestion status of a circuit-switched network to a mobile terminal operating in an LTE network. A congestion indication is introduced to indicate the congestion status of the circuit-switched network. Other congestion information, such as a persistence parameter (PSIST), may be transmitted with the congestion indication. The congestion indication is transmitted from an interworking function in the circuit-switched network to the LTE network. In one exemplary embodiment, the congestion indication and/or other congestion information is transmitted along with a circuit services signaling message that is otherwise being sent. Piggy-backing the congestion information with other circuit services signaling reduces the amount of signaling over the LTE network.

In some embodiments of the invention, the congestion information may be transmitted in the header of a tunneling packet that contains the circuit services notification message. Alternatively, the congestion information may be transmitted as an information element within a new or modified circuit services signaling message. In other embodiments, the congestion information may be transmitted in a separate message at the same time as the circuit services signaling message. Other method may be used to link the transmission of the congestion information to the transmission of the circuit services signaling message.

One exemplary embodiment of the invention comprises a signaling method implemented by an interworking function for sending signaling messages between a circuit-switched network and a packet-switched network. The signaling method comprises receiving, at the interworking function, a circuit services signaling message from a mobile switching center in the circuit-switched network; sending, by the interworking function, the circuit services signaling message to a mobile terminal in the packet-switched network; and sending, by the interworking function, a congestion indication indicative of the congestion status in the circuit-switched network to the packet-switched with the circuit services signaling message.

DETAILED DESCRIPTION

Figure 1:
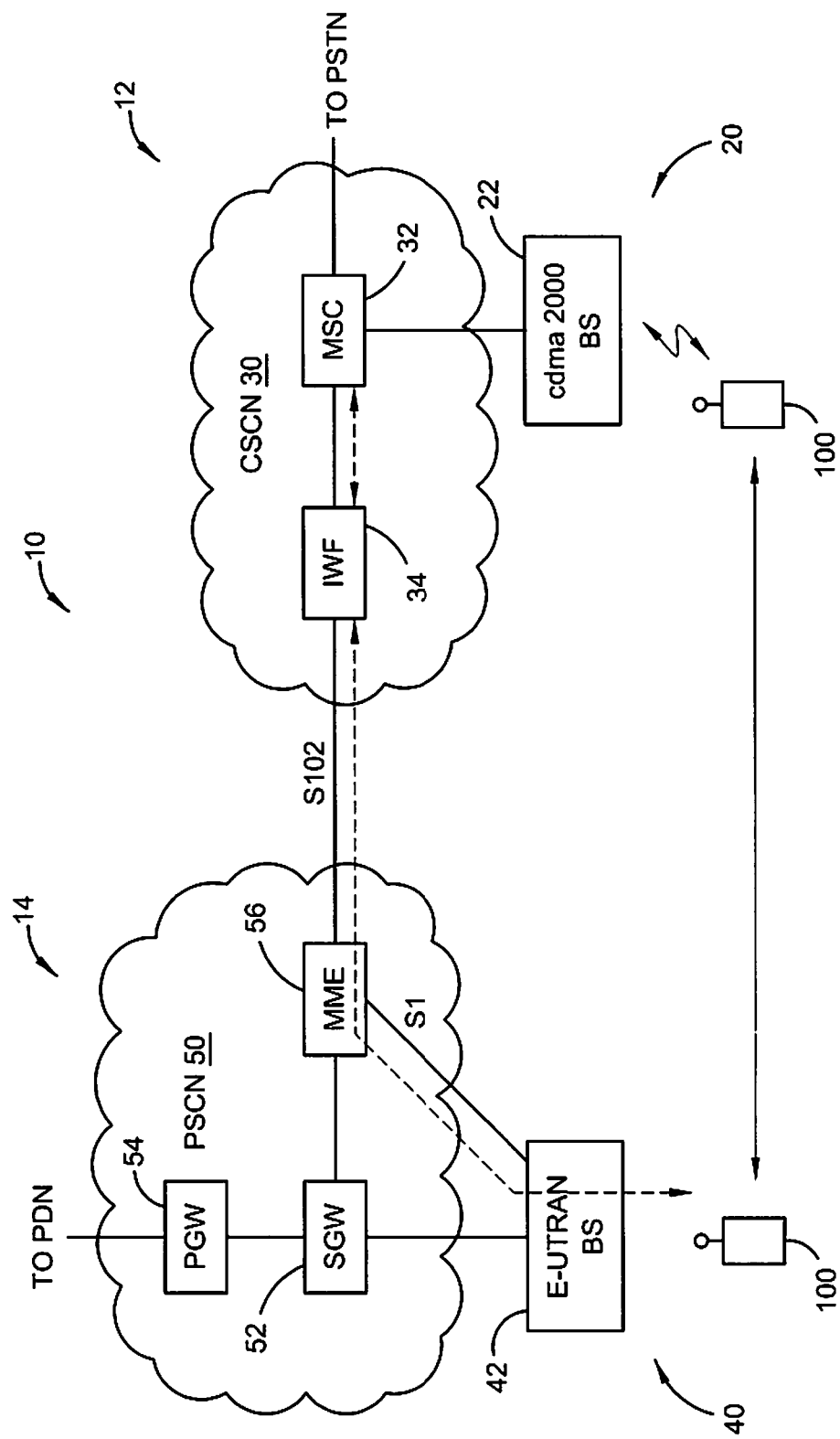
FIG. 1 illustrates an exemplary hybrid network.

Referring now to the drawings, the present invention will be described in the context of a hybrid network 10 providing both voice and data services to mobile terminals 100. In the exemplary embodiment shown herein, the hybrid network 10 combines a cdma2000 network 12 for circuit-switched services (e.g., voice) and an LTE network 14 for high speed data services. The cdma2000 network may comprise a 1×RTT network. Those skilled in the art will appreciate that cdma2000 network 12 may, in some embodiments, also provide data services in addition to circuit-switched services. The exemplary embodiment is intended to be illustrative only and those skilled in the art will appreciate that the present invention may be used in networks based on other network standards.

Cdma2000 network 12 comprises a cdma2000 radio access network 20 connected to a circuit-switched core network (CSCN) 30. The cdma2000 radio access network 20 comprises one or more base stations 22 for communicating with mobile terminals 100 in the coverage area of the cdma2000 radio access network 20. Though shown as a single entity in FIG. 1, the base stations 22 typically comprise a base transceiver station (BTS) and base station controller (BSC), which may embodied in different network nodes at different locations. The BTS includes the radio equipment for communicating with the mobile terminal 100 over the air interface, while the BSC provides radio resource control and management functions for one or more BTSs. The CSCN 30 includes a Mobile Switching Center (MSC) 32 that provides a connection to a public switched telephone network (PSTN) and switches calls to and from the mobile terminal 100. The base stations 22 forward downlink traffic and signaling from the MSC 32 to the mobile terminals 100 and forward uplink traffic and signaling from the mobile terminals 100 to the MSC 32.

LTE network 14 comprises an LTE radio access network 40 connected to a packet-switched core network (PSCN) 50. The LTE radio access network 40 comprises one or more access networks (ANs) 42 for communicating with mobile terminals 100 in the coverage area of the LTE radio access network 40. The LTE radio access network 40 is also referred to as a Evolved Universal Terrestrial Radio Access Network (E-UT-RAN), and the ANs 42 are also known as Evolved NodeBs (eNodeBs). The access nodes or eNodeBs 42 are analogous to the base stations 22 in the cdma2000 network except that access nodes 42 combine the functions of the BTS and BSC into a single network node. The PSCN 50, also known as an Evolved Packet Core (EPC), includes a Serving Gateway (SGW) 52, Packet Data Network Gateway (PGW) 54, and Mobility Management Entity (MME) 56. The SGW 52 and PGW 54 provide connection to external packet data networks (PDNs), such as the Internet. The SGW 52 is a user-plane node connecting the PSCN 50 to the ANs 42 in the LTE radio access network 40, and serves as a mobility anchor point for the mobile terminal 100 as it moves between cells. The PGW 54 is a user-plane node connecting the PSCN 50 to external packet data networks (PDNs), such as the Internet. The MME 56 is a control plane node that handles the control functions of the PSCN 50, such as mobility management, billing, etc.

In the exemplary embodiment, circuit-switched fall back (CSFB) is used to provide voice services to the mobile terminal 100 operating in the LTE network 14. After the mobile terminal 100 attaches to the LTE network 14, the mobile terminal 100 registers with the cdma2000 network 12. The CSFB procedure provides a signaling channel for sending circuit services signal messages between the cdma2000 network 12 and mobile terminal 100 over the LTE network 14. The signaling channel can be used to notify the mobile terminal 100 about incoming voice calls and SMS messages. The mobile terminal 100 can hand over to the cdma2000 network 12 in areas of overlapping coverage to answer incoming voice calls or to make outgoing voice calls.

In the cdma2000 network 12, a congestion control mechanism is used to limit the number of access attempts by mobile terminals 100 when the cdma2000 network 12 is overloaded. The objective of the congestion control mechanism is to reduce the number of mobile-terminated and mobile-originated call attempts when the cdma2000 network 12 is overloaded. The congestion control mechanism uses a persistence parameter broadcast over a downlink broadcast channel by the cdma2000 base stations 22. The persistence parameter determines the probability that the mobile terminal 100 will pass a random check and send an access request. Thus, the persistence parameter is used to throttle the number of access attempts made by the mobile terminals 100. The persistence parameter can be dynamically adjusted as the load conditions change so as to reduce the probability of an access attempt by a mobile terminal 100 as congestion increases and to increase the probability of an access attempt as congestion decreases.

Because the persistence parameter is transmitted by the cdma2000 base station 22, a mobile terminal 100 operating in the LTE network 14 will not receive the persistence parameters. Thus, the mobile terminals 100 in the LTE network 14 will not know when the cdma2000 network is congested. The present invention solves this problem by providing a mechanism to signal the congestion status of the circuit switched network 12 to the LTE base station 42 and/or MME 56.

A congestion indication is introduced to indicate the congestion status of the circuit switched network 12. The congestion indication is transmitted from the interworking function 34 to the MME 56 over the S102interface, and from the MME 56 to the LTE base station 42 over the S1 interface. The S102interface between interworking function 34 and MME 56 provides a tunnel for relaying 1×circuit services (1×CS) signaling messages from the cdma2000 network 12 to the packet switched network 14. The 1×CS signaling messages are those messages defined for the A21interface as described in 3GPP2 S0008-C, "Interoperability specification (IOS) for high rate packet data (HRPD) radio access network interfaces with session control in the access network." The S102 interface is described in 3GPP TS 29.277 v.8.1.0 (2008-12), "Optimized handover procedures and protocol between EUTRAN access and non-3GPP accesses (S102); Stage 3."

The transmission of the congestion information is linked to the transmission of the circuit services signaling message. In some embodiments of the invention, the congestion information may be transmitted in the header of an S102tunneling packet that contains the circuit services notification message. Alternatively, the congestion information may be transmitted as an information element within a new or modified circuit services signaling message. Also, it is noted that the 1×CS message set includes a 1×CS event notification message. The congestion indication may be implemented by defining a new event value to indicate when the circuit-switched network is congested. In other embodiments, the congestion information may be transmitted in a separate message at essentially the same time (without intervening messages in the signaling sequence) as the circuit services signaling message. Similar approaches can be used to convey the congestion indication from the MME 56 to the LTE base station 42 over the S1interface.

The congestion indication and/or other congestion information (e.g., persistence parameter) may be transmitted from the interworking function 34 to the MME 56 when the cdma2000 network 12 is congested or when a mobile terminal access attempt fails. The congestion indication and/or other congestion information will be valid for future access attempts or until new congestion information is received. The congestion information may also be transmitted during other signaling procedures over the S102 and S1 interfaces. For example, congestion information can be transferred to the MME 56 and LTE base station 42 during paging and/or registration procedures. Within the CSCN 30, an DAM system may be used to convey congestion information to the interworking function 34.

Figure 2:
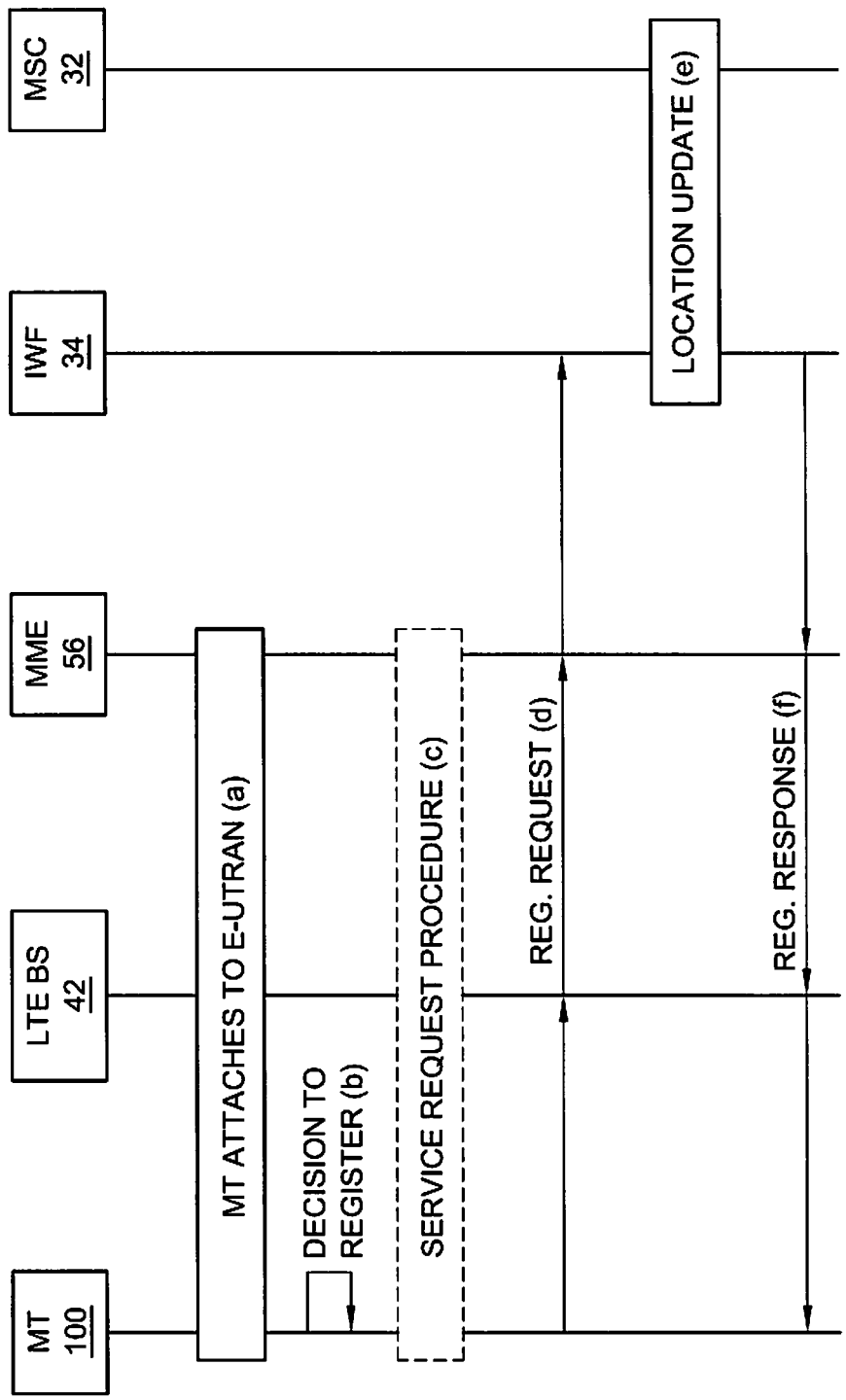
FIG. 2 illustrates an exemplary registration procedure to enable a mobile terminal in an LTE network to register with a 3G network.

FIG. 2 illustrates a procedure for registration of a mobile terminal 100 in the packet switched network with the MSC 32 in the CSCN 30. Mobile terminal 100 attaches to the E-UTRAN as specified in TS 23.401 (a). After the mobile terminal 100 is attached to the E-UTRAN, the mobile terminal 100 decides to register with the cdma2000 network (b). The decision to register with the cdma2000 network 12 may be triggered, for example, by an indication from the E-UTRAN when the mobile terminal 100 is in a connected state. If the mobile terminal 100 is in an idle state at the time it attempts to register with the circuit-switched network 12, the mobile terminal 100 may need to perform a service request procedure to create a signaling connection with the MME 56 (c). Once the signaling connection with the MME 56 is established, the mobile terminal 100 generates a registration request and sends the registration request to the interworking function 34 (d). The interworking function 34 performs a location update (e) and sends a registration response to the mobile terminal 100 (f). The registration response may include a congestion indication and/or other congestion information, such as a persistence parameter.

Figure 3:
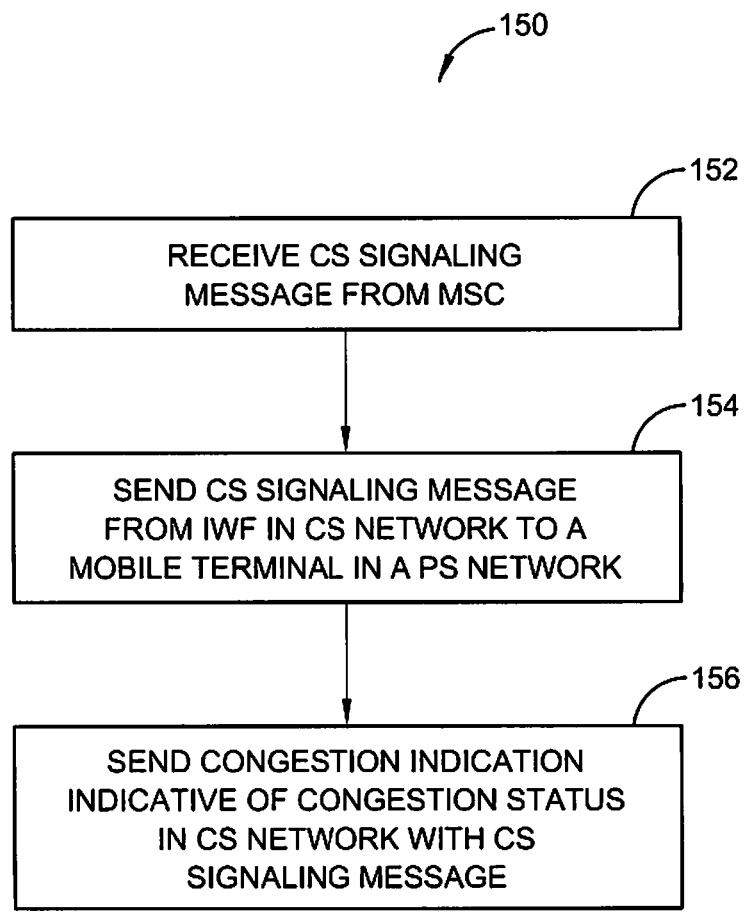
FIG. 3 illustrates an exemplary method of signaling congestion information between a circuit-switched network and packet-switched network.

FIG. 3 illustrates an exemplary procedure 150 implemented by the interworking function 34 for transferring congestion information to the MME 56. The procedure 150 begins when the interworking function 34 receives a 1×CS signaling message from the MSC 32 in cdma2000 network 12 (block 152). The interworking function 34 relays the 1×CS signaling message toward the mobile terminal 100 in the LTE network 14 over the S102 interface (block 154). The MME 56 relays the 1×CS signaling message over the S1 interface to the LTE base station 42, which transmits the 1×CS signaling message to the mobile terminal 100. To indicate the congestion status, the interworking function 34 sends a congestion indication indicative of the congestion status in the circuit switched network with the circuit services signaling message. By piggy-backing the congestion information on other 1×CS signaling messages, the signaling overhead and the number of signaling occasions is reduced.

Figure 4:
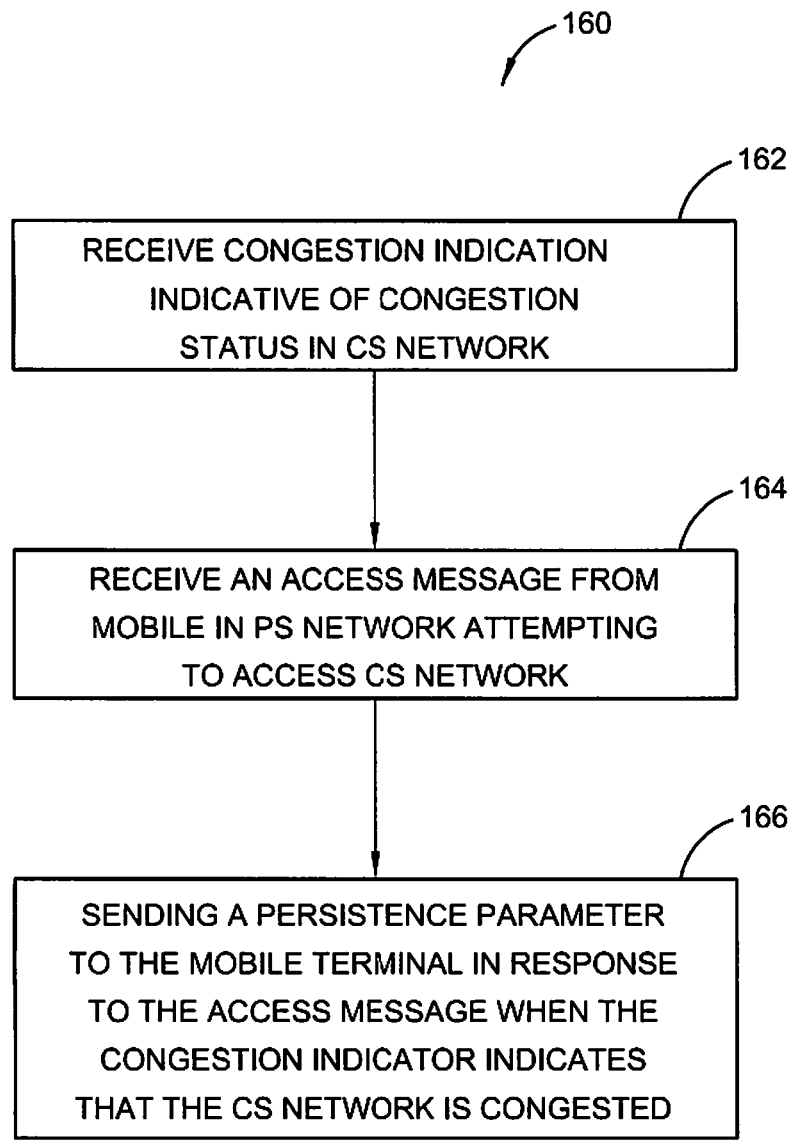
FIG. 4 illustrates an exemplary method of signaling congestion information to a mobile terminal in a packet-switched network.

FIG. 4 illustrates an exemplary procedure 160 implemented by either the MME 56 or LTE base station 42 for providing congestion information to the mobile terminal 100. The procedure begins when the MME 56 of LTE base station 42 receives a congestion indication indicative of the congestion status in the cdma2000 network 12 (block 162). As previously noted, the congestion indication is received by the MME 56 from the interworking function 34 over the S102 interface. The LTE base station 42 receives the congestion indication from the MME 56 over the S1 interface. The MME 56 and/or LTE base station 42 stores the congestion indication along with any other provided congestion information. Subsequently, the LTE base station 42 or MME 56 receives an access message from a mobile terminal 100 in the LTE network 14 attempting to access the cdma2000 network 12 (block 164). In response to the access message, the MME 56 or LTE base station 42 sends congestion information to the mobile terminal 100 (block 166). In one exemplary embodiment, the MME 56 or LTE base station 42 sends a persistence parameter to the mobile terminal 100 in response to an extended service request message from the mobile terminal 100. In this scenario, the persistence parameter controls the probability that the mobile terminal 100 will continue or abort the access attempt.

Figure 5:
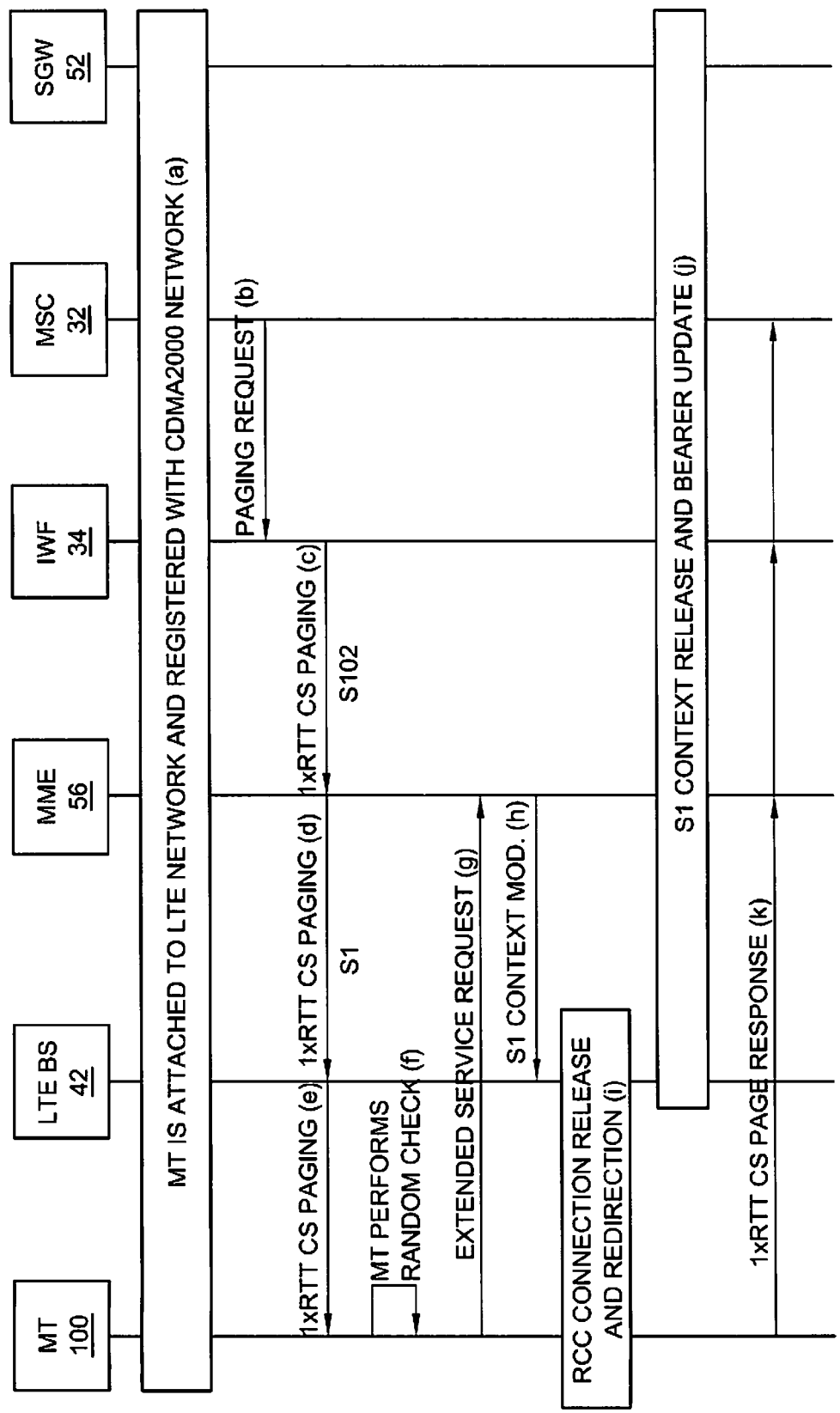
FIG. 5 illustrates an exemplary mobile-terminated call procedure.

FIG. 5 illustrates an exemplary circuit-switched fallback procedure for a mobile-terminated call according to one embodiment of the invention. The mobile terminal 100 is attached to the LTE network 14 and registered with the cdma2000 network 12 (a). When a call is made to the mobile terminal 100, the MSC 32 sends a paging request to the mobile terminal 100 via the interworking function 34 (b). The interworking function 34 forwards the paging request to the MME 56 over the S102 interface (c). A congestion indicator or other congestion information may be transmitted with the paging request from the IWF 34 to the MME 56. The MME 56 in turn forwards the paging request and any congestion information to the LTE base station 42 over the S1 interface (d).

The LTE base station 42 then transmits the paging request to the mobile terminal 100 over the downlink (e).

It is presumed that the mobile terminal 100 has previously received a persistence parameter from the LTE base station 42, or has been otherwise provisioned with the persistence parameter. When the paging request is received, the mobile terminal 100 performs a random check (f). If the mobile terminal 100 decides to accept the call based on the random check, the mobile terminal 100 sends an extended service request to the MME 56 (g). The MME 56 then sends a UE context modification message with a circuit-switched fallback indicator to the LTE base station 42 to instruct the LTE base station 42 to hand over the mobile terminal 100 to the cdma2000 network 12 (h). The LTE base station 42 then triggers radio resource control (RRC) connection release and redirects the mobile terminal 100 to the cdma2000 network 12 (i). During the RRC connection release procedure, the LTE base station 42 may send congestion information, such as the persistence parameter, to the mobile terminal 100. The LTE base station 42 also triggers a context release and bearer update (j). During the context release and bearer update procedure, the cdma2000 network 12 may send an updated congestion indication and/or other congestion information to the MME 56 and/or LTE base station 42.

The mobile terminal 100 hands over to the cdma2000 network 12 and sends a page response to the MSC 32 (k). The page response is transmitted to the cdma2000 base station 22 and forwarded by the cdma2000 base station 22 to the MSC 32. The mobile terminal 100 then performs a procedure for mobile-terminated call establishment as specified in 3GPP2 A.S0013.

Figure 6:
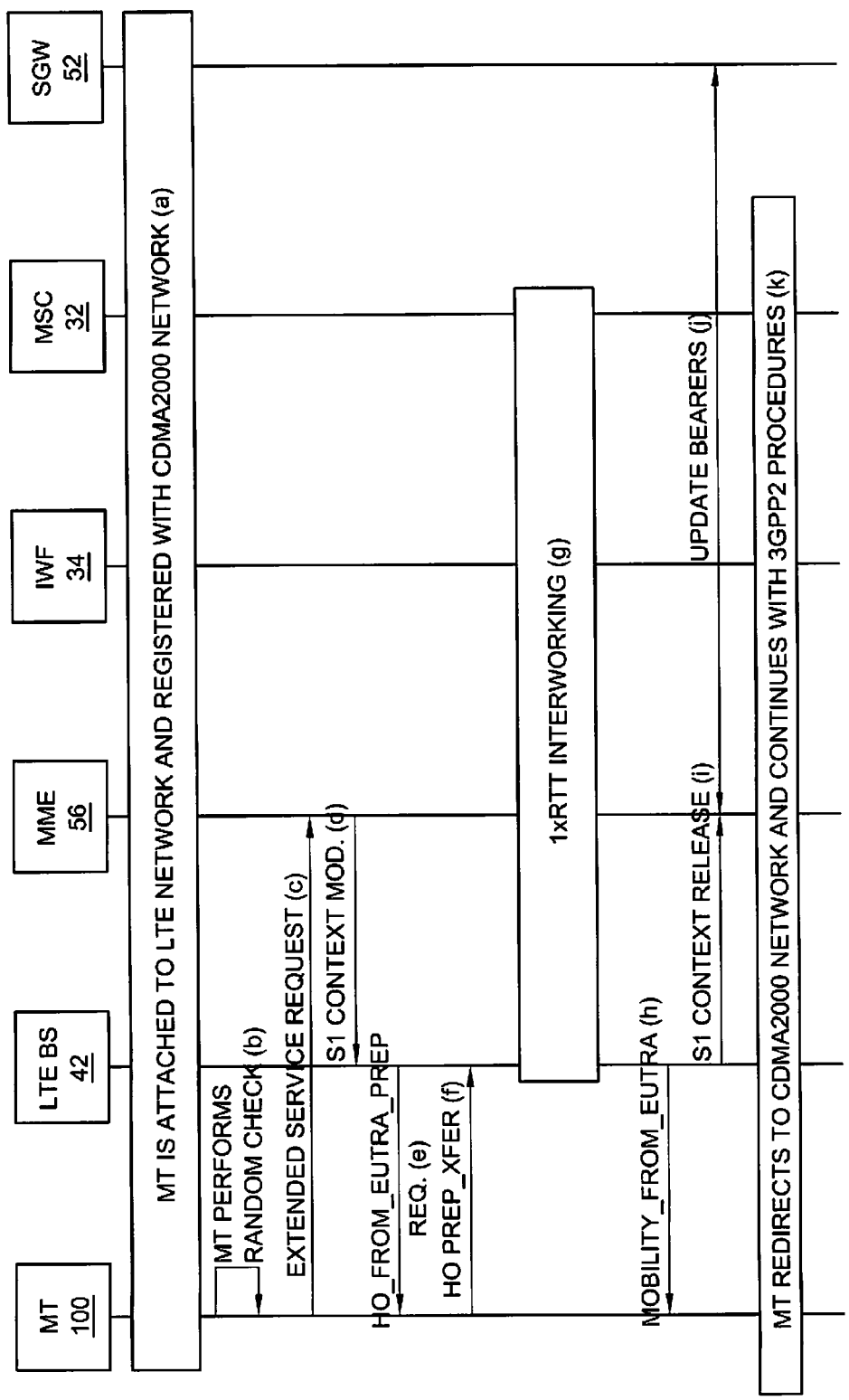
FIG. 6 illustrates an exemplary mobile-originated call procedure.

FIG. 6 illustrates an exemplary circuit-switched fallback procedure for a mobile-originated call according to one embodiment. In this embodiment, the mobile terminal 100 is attached to the LTE network 14 and registered with the cdma2000 network 12 (a). If the mobile terminal 100 has previously received a precipitous parameter from the LTE base station 42, the mobile terminal 100 performs a random check before accessing the cdma2000 network 12 (b). This step may be skipped if the mobile terminal 100 is not provisioned with a persistence parameter. If the mobile terminal 100 decides to make the call based on the random check, the mobile terminal 100 sends an extended service request to the MME 56 (c). The MME 56 sends a UE context modification with a circuit-switched fallback indicator to the LTE base station 42 to instruct the LTE base station 42 to hand over the mobile terminal 100 to the cdma2000 network 12 (d). The LTE base station 42 sends a handover from EUTRA preparation request message to the mobile terminal 100 to initiate the fallback procedure (e). The handover preparation request message includes 3G1x overhead parameters and a RAND value. The handover preparation request message may also include congestion information, such as a congestion indicator and/or persistence parameter. The mobile terminal 100 then updates the congestion information stored in its memory.

The mobile terminal 100 responds to the handover preparation request message by sending a handover preparation transfer message to the LTE base station 42 (f). The handover preparation transfer message includes the 1×RTT origination message with the called party number. Signaling messages are transferred between the LTE base station 42 and MSC 32 using conventional interworking procedures (g). The LTE base station 42 then sends a handover command to the mobile terminal 100 to instruct the mobile terminal 100 to handover (h). The LTE base station 42 also triggers a context release (i) and bearer update (j). The mobile terminal 100 hands over to the cdma2000 network 12 and continues with standard 3GPP2 procedures to establish a mobile-originated call (k).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling access to a circuit-switched network by mobile terminals in a packet-switched network, said method comprising:
   receiving a congestion indication indicative of a congestion status in the circuit-switched network from the circuit-switched network;
   subsequently receiving an access message from a mobile terminal in the packet-switched network attempting to access said circuit-switched network; and
   sending a persistence parameter to said mobile terminal responsive to said access message when said congestion indicator indicates that the circuit-switched network is congested, wherein the congestion indicator is stored in a mobile management entity in the packet-switched network, and wherein the persistence parameter controls a probability that the mobile terminal will continue or abort an access attempt.

2. The method of claim 1 further comprising receiving the persistence parameter from the circuit-switched network with the congestion indication.

3. The method of claim 1 wherein receiving the congestion indication indicative of congestion in the circuit-switched network from the circuit-switched network comprises receiving the congestion indication from an interworking function in the circuit-switched network.

4. The method of claim 1 wherein receiving the access message from the mobile terminal in the packet-switched network attempting to access said circuit-switched comprises receiving an extended service request message from the mobile terminal.

5. The method of claim 4 wherein sending the persistence parameter to said mobile terminal responsive to said message when said congestion indicator indicates that the circuit-switched network is congested comprises sending said persistence parameter responsive to said extended service request message.

6. The method of claim 5 wherein sending said persistence parameter responsive to said extended service request message comprises sending said persistence parameter with one or more circuit services parameters.

7. The method of claim 1, wherein the persistence parameter is used to throttle a number of access attempts made my mobile terminals.

8. The method of claim 1, wherein the persistence parameter is dynamically adjusted as load conditions change so as to reduce a probability of an access attempt by a mobile terminal as congestion increases and to increase a probability of an access attempt as congestion decreases.

9. A network node in a packet switched network located in a path between a mobile terminal in a packet-switched network and an interworking function in a circuit-switched network, said network node comprising:
   an interface circuit for connecting said network node to the packet-switched network, wherein the network node is a mobility management entity in the packet-switched network; and a congestion controller configured to:
- receive a congestion indication indicative of a congestion status in the circuit-switched network;
- subsequently receive an access message from the mobile terminal in the packet-switched network attempting to access said circuit-switched; and
- send a persistence parameter to said mobile terminal responsive to said access message when said congestion indication indicates that the circuit-switched network is congested, wherein the persistence parameter controls a probability that the mobile terminal will continue or abort an access attempt.

10. The network node of claim 9 wherein the congestion controller is further configured to receive the persistence parameter from the circuit-switched network.

11. The network node of claim 9 wherein the congestion controller is configured to receive the congestion indication from the interworking function in the circuit-switched network.

12. The network node of claim 9 wherein the congestion controller is configured to send the persistence parameter responsive to an extended service request message from the mobile terminal.

13. The network node of claim 12 wherein the congestion controller is configured to send the persistence parameter responsive to the extended service request message.

14. The network node of claim 13 wherein the congestion controller is configured to send said persistence parameter with one or more circuit services parameters.

* * * * *